United States Patent
Sethi et al.

(10) Patent No.: US 12,524,063 B2
(45) Date of Patent: Jan. 13, 2026

(54) STATE-BASED AUTOMATED ALLOCATION OF POWER TO COMPUTE SERVERS IN A CHASSIS OF A MODULAR SERVER

(71) Applicant: Dell Products L.P., Round Rock, TX (US)

(72) Inventors: Parminder Singh Sethi, Punjab (IN); Pandiyarajan Mani, Gudiyattam (IN)

(73) Assignee: Dell Products L.P., Round Rock, TX (US)

( * ) Notice: Subject to any disclaimer, the term of this patent is extended or adjusted under 35 U.S.C. 154(b) by 96 days.

(21) Appl. No.: 18/392,671

(22) Filed: Dec. 21, 2023

(65) Prior Publication Data

US 2025/0208692 A1    Jun. 26, 2025

(51) Int. Cl.
*G06F 1/3293* (2019.01)
(52) U.S. Cl.
CPC ................... *G06F 1/3293* (2013.01)
(58) Field of Classification Search
CPC .... G06F 1/3293; G06F 1/3203; G06F 9/4806; G06F 13/14; G06F 9/4881; G06F 9/50
See application file for complete search history.

(56) References Cited

U.S. PATENT DOCUMENTS

| | | | | |
|---|---|---|---|---|
| 2003/0177165 A1* | 9/2003 | Bradley | ............. | H05K 7/20836 718/105 |
| 2005/0177755 A1* | 8/2005 | Fung | ..................... | G06F 1/3209 713/300 |
| 2009/0319808 A1* | 12/2009 | Brundridge | ............... | G06F 1/26 713/300 |
| 2012/0072745 A1* | 3/2012 | Ahluwalia | ................ | G06F 1/26 713/340 |
| 2013/0109443 A1* | 5/2013 | Eaton | ................ | H04W 52/0296 455/572 |

(Continued)

OTHER PUBLICATIONS

Ogle, Matt et al.; "Full Redudancy vs. Fault Tolerant Redundancy for PowerEdge Server PSUs;" Dell Technology Info Hub; Jan. 16, 2023.

(Continued)

*Primary Examiner* — Hyun Soo Kim
(74) *Attorney, Agent, or Firm* — Ryan, Mason & Lewis, LLP

(57) ABSTRACT

Techniques are provided for state-based automated allocation of power to compute servers in a chassis of a modular server. One method comprises obtaining, for a modular server comprising a chassis with multiple compute servers, information characterizing pending requests for an allocation of power for the compute servers; monitoring a state of the compute servers; in response to a given compute server having a first designated state (e.g., the given compute server being non-responsive): obtaining at least a portion of the information characterizing a pending request for the allocation of power for the given compute server; determining whether the pending request for the allocation of power for the given compute server has been granted; and applying the requested allocation of power to the given compute server in response to the pending request being granted and the given compute server having a second designated state (e.g., the given compute server being responsive).

20 Claims, 10 Drawing Sheets

(56) References Cited

U.S. PATENT DOCUMENTS

| | | | | |
|---|---|---|---|---|
| 2016/0011914 A1* | 1/2016 | Bohn | ................... | G06F 9/5094 |
| | | | | 713/300 |
| 2016/0378158 A1* | 12/2016 | Allen-Ware | .............. | G06F 1/30 |
| | | | | 714/14 |
| 2019/0369694 A1* | 12/2019 | Diamand | .............. | G06F 1/3243 |

OTHER PUBLICATIONS

"PowerEdge Enterprise Servers _ Blade Servers _ Dell USA;" downloaded Dec. 14, 2023.
"Dell PowerEdge-MX7000-Technical-Guide;" Regulatory Model: E44S Series; Regulatory Type: E442001; Oct. 2021.

* cited by examiner

600-A

```
                         POWER BUDGET TABLE

SYSTEM POWER ALLOCATIONS BY CATEGORY:
BASE POWER INCLUDES 15W POWER ALLOCATION REQUEST PER SLOT

TOTAL BASE POWER      FTB =  228.0    FTR =  228.0    NLB =  228.0
  TOTAL THERMAL POWER   FTB = 1562.0    FTR = 1562.0    NLB = 1562.0
  TOTAL IOM POWER       FTB =  224.0    FTR =  224.0    NLB =  224.0
  TOTAL SERVER POWER    FTB = 6245.0    FTR = 4505.0    NLB = 4430.0
                               ======           ======         ======
  TOTAL SYSTEM POWER    FTB = 8259.0    FTR = 6519.0    NLB = 6444.0
```

```
                    POWER BUDGET TABLE

SYSTEM POWER ALLOCATION DETAIL:
THERMAL-0-0-0   FTB =  118    FTR =  118    NLB =  118
THERMAL-1-0-0   FTB =  118    FTR =  118    NLB =  118
THERMAL-2-0-0   FTB =  118    FTR =  118    NLB =  118
THERMAL-3-0-0   FTB =  118    FTR =  118    NLB =  118
THERMAL-4-0-0   FTB =  218    FTR =  218    NLB =  218
THERMAL-5-0-0   FTB =  218    FTR =  218    NLB =  218
THERMAL-6-0-0   FTB =  218    FTR =  218    NLB =  218
THERMAL-7-0-0   FTB =  218    FTR =  218    NLB =  218
THERMAL-8-0-0   FTB =  218    FTR =  218    NLB =  218
IOM-1-0-0       FTB =   56    FTR =   56    NLB =   56
IOM-2-0-0       FTB =   56    FTR =   56    NLB =   56
IOM-3-0-0       FTB =   56    FTR =   56    NLB =   56
IOM-4-0-0       FTB =   56    FTR =   56    NLB =   56
SERVER -1-0-0   FTB = 1024    FTR =  761    NLB =  710
SERVER -2-0-0   FTB = 1508    FTR =  986    NLB =  975
SERVER -3-0-0   FTB = 1508    FTR =  986    NLB =  975
SERVER -5-0-0   FTB = 1161    FTR =  886    NLB =  885
SERVER -7-0-0   FTB = 1044    FTR =  886    NLB =  885
```

FIG. 6B

STATE-BASED AUTOMATED ALLOCATION OF POWER TO COMPUTE SERVERS IN A CHASSIS OF A MODULAR SERVER

BACKGROUND

Electronic equipment configured to provide desired system functionality is often installed in a chassis. Such electronic equipment can include, for example, compute servers, storage servers, thermal control devices and power supply units. A management module of the chassis allocates power from the power supply units to the compute servers, for example.

SUMMARY

Illustrative embodiments of the disclosure provide techniques for state-based automated allocation of power to compute servers in a chassis of a modular server. An exemplary method comprises obtaining, for a modular server comprising a chassis with a plurality of compute servers, information characterizing a plurality of pending requests for an allocation of power for respective ones of the plurality of compute servers; monitoring a state of one or more of the plurality of compute servers; in response to a given one of the plurality of compute servers having a first designated state: obtaining at least a portion of the information characterizing a pending request for the allocation of power for the given compute server; determining whether the pending request for the allocation of power for the given compute server has been granted; and applying the requested allocation of power to the given compute server in response to the pending request being granted and the given compute server having a second designated state.

Illustrative embodiments can provide significant advantages relative to conventional techniques for allocating power in a chassis of a modular server. For example, problems associated with existing power allocation techniques are overcome in one or more embodiments by maintaining information characterizing pending power allocation requests for compute servers and automatically granting a given pending request in response to the corresponding compute server having a designated state.

These and other illustrative embodiments include, without limitation, methods, apparatus, networks, systems and processor-readable storage media.

BRIEF DESCRIPTION OF THE DRAWINGS

FIGS. 6A and 6B, collectively, comprise an exemplary implementation of a power budget table of FIG. 3 in an illustrative embodiment;

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Existing automated power allocation techniques often require manual intervention (e.g., manually triggering a system reset) to recover from a number of system errors that may be encountered with respect to an allocation of power to a compute server in a chassis of a modular server. For example, a given compute server may become inactive when a management module does not respond to a request for additional power or when the given compute server does not have sufficient power. If an execution of a compute server halts during a boot process, for example, and the compute server does not receive a power allocation reply from the management module, the compute server may not automatically request a power allocation from the management module when the compute server resumes execution and thus may not receive an allocation of power.

One or more aspects of the disclosure recognize that power may be automatically allocated to compute servers in the chassis based on one or more designated states of the compute servers. In one or more embodiments, a first table is maintained characterizing pending requests for an allocation of power to compute servers, and when a given compute server is in a first designated state (e.g., the given compute server failing to respond to one or more communications, or another indication that the compute server is not in a healthy state), the first table is accessed to automatically evaluate a pending request for the allocation of power for the given compute server. The requested power may be applied to the given compute server when the pending request is granted following the evaluation and the given compute server is in a second designated state (e.g., the given compute server being responsive to one or more communications or otherwise in a healthy state). In addition, a processor frequency of at least one compute server may be automatically reduced when the at least one compute server exceeds a power usage threshold.

Figure 1:
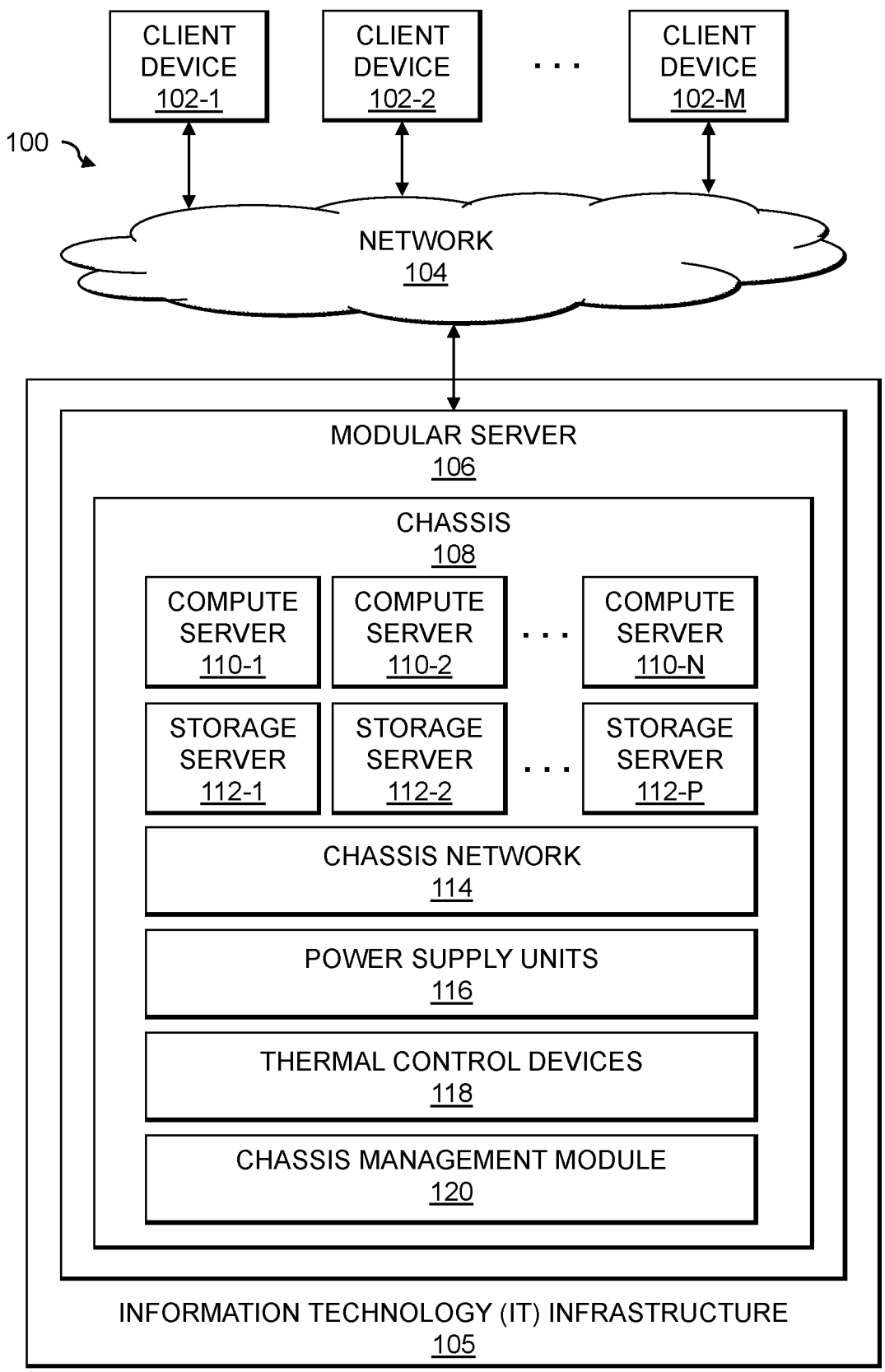
FIG. 1 is a block diagram of an information processing system configured for state-based automated allocation of power to compute servers in a chassis of a modular server in an illustrative embodiment.

FIG. 1 shows an information processing system 100 configured in accordance with an illustrative embodiment. The information processing system 100 is assumed to be built on at least one processing platform and provides functionality for state-based automated allocation of power to compute servers in a chassis of a modular server. The information processing system 100 includes a set of client devices 102-1, 102-2, ... 102-M (collectively, client devices 102) which are coupled to a network 104. Also coupled to the network 104 is an IT infrastructure 105 comprising one or more IT assets including at least one modular server 106. The IT assets of the IT infrastructure 105 may comprise physical and/or virtual computing resources. Physical computing resources may include physical hardware such as compute servers, storage servers, networking equipment, Internet of Things (IoT) devices, other types of processing and computing devices including desktops, laptops, tablets, smartphones, etc. Virtual computing resources may include virtual machines (VMs), containers, etc.

The modular server 106 includes a chassis 108 in which a set of compute servers 110-1, 110-2, ... 110-N (collectively, compute servers 110) and a set of storage servers 112-1, 112-2, ... 112-P (collectively, storage servers 112) are installed. The chassis 108 also includes a chassis network 114, one or more power supply units (PSUs) 116, one or more thermal control devices 118 (e.g., fans) and a chassis management module 120.

In some embodiments, the modular server 106 is used for an enterprise system. For example, an enterprise may have various IT assets, including the modular server 106, which it operates in the IT infrastructure 105 (e.g., for running one or more software applications or other workloads of the enterprise) and which may be accessed by users of the enterprise system via the client devices 102. As used herein, the term "enterprise system" is intended to be construed broadly to include any group of systems or other computing devices. For example, the IT assets of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

Although not explicitly shown in FIG. 1, one or more input-output devices such as keyboards, displays or other types of input-output devices may be used to support one or more user interfaces to the modular server 106, as well as to support communication between the modular server 106 and other related systems and devices not explicitly shown.

In some embodiments, the client devices 102 are assumed to be associated with system administrators, IT managers or other authorized personnel responsible for managing the IT assets of the IT infrastructure 105, including the modular server 106. For example, a given one of the client devices 102 may be operated by a user to access a graphical user interface (GUI) provided by the chassis management module 120 to manage one or more of the compute servers 110 and/or one or more of the storage servers 112.

In one or more embodiments, the chassis network 114 interconnects one or more components of the chassis 108, for example. The PSUs 116 provide power in some embodiments to one or more components of the chassis 108. The thermal control devices 118 may be implemented as fans to cool one or more components of the chassis 108.

The chassis management module 120 may employ open management techniques to manage one or more components of the chassis 108, such as configuration, power consumption, instrumentation, anomalies, and utilization. For example, the chassis management module 120 may provide node, rack, row and/or data-center level aggregation of power-management data and execution of one or more control policies.

The chassis management module 120 may be used to deploy compute servers 110 and storage servers 112, to update firmware, and to manage and monitor the overall health of the chassis 108 and the components of the chassis 108, such as the compute servers 110, the storage servers 112 and the chassis network 114, for example. As discussed further below, storage space within the chassis management module 120 is utilized in some embodiments by the disclosed automated power allocation techniques to store power-related information.

In some embodiments, at least some of the functionality of the chassis management module 120 may be implemented outside the chassis management module 120 (e.g., on one or more other ones of the IT assets of the IT infrastructure 105, on one or more of the client devices 102, an external server or a cloud-based system, etc.).

In one or more embodiments, the client devices 102, the compute servers 110 and/or the storage servers 112 may implement host agents that are configured for automated transmission of information regarding the modular server 106 (e.g., current power-related information). It should be noted that a "host agent" as this term is generally used herein may comprise an automated entity, such as a software entity running on a processing device. Accordingly, a host agent need not be a human entity.

The chassis management module 120 in the FIG. 1 embodiment is assumed to be implemented using at least one processing device. Each such processing device generally comprises at least one processor and an associated memory, and implements one or more functional modules or logic for controlling certain features of the modular server 106. In the FIG. 1 embodiment, the chassis management module 120 implements the disclosed automated power allocation techniques.

The term storage system (including storage servers 112) as used herein is intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

It is to be appreciated that the particular arrangement of the client devices 102, the IT infrastructure 105 and the modular server 106 illustrated in the FIG. 1 embodiment is presented by way of example only, and alternative arrangements can be used in other embodiments. As discussed above, for example, the modular server 106 (or portions of components thereof, such as one or more of the chassis management module 120) may in some embodiments be implemented internal to one or more of the client devices 102 and/or other IT assets of the IT infrastructure 105.

At least portions of the chassis management module 120 may be implemented at least in part in the form of software that is stored in memory and executed by a processor.

The modular server 106 and other portions of the information processing system 100, as will be described in further detail below, may be part of cloud infrastructure.

The modular server 106 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the modular server 106 or components thereof (e.g., the compute servers 110, the storage servers 112, the chassis network 114, the PSUs 116, the thermal control devices 118 and the chassis management module 120) may be implemented on respective distinct processing platforms, although numerous other arrangements are possible. For example, in some embodiments at least portions of the modular server 106 and one or more of the client devices 102 are implemented on the same processing platform. A given client device (e.g., client device 102-1) can therefore be implemented at least in part within at least one processing platform that implements at least a portion of the modular server 106.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, and the modular server 106, or portions or components thereof, to reside in different data centers. Numerous other distributed implementations are possible.

Additional examples of processing platforms utilized to implement the information processing system 100 in illustrative embodiments will be described in more detail below in conjunction with FIGS. 11 and 12.

It is to be appreciated that these and other features of illustrative embodiments are presented by way of example only, and should not be construed as limiting in any way.

It is to be understood that the particular set of elements shown in FIG. 1 for state-based automated allocation of power to compute servers 110 in the chassis 108 of the modular server 106 is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
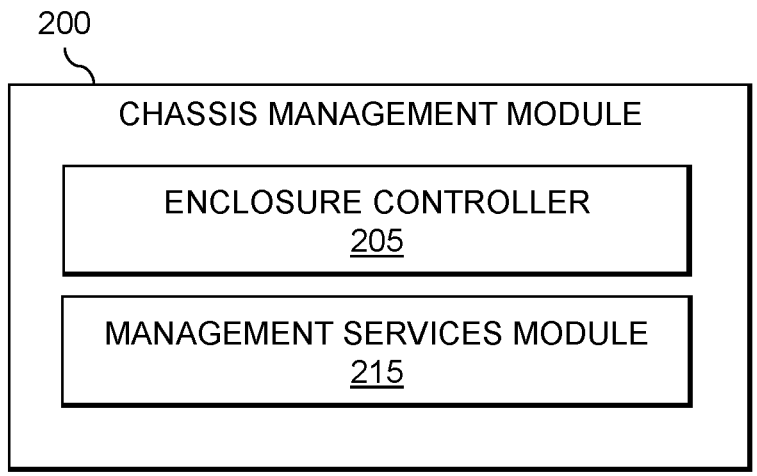
FIG. 2 illustrates an exemplary implementation of the chassis management module of FIG. 1 in further detail in an illustrative embodiment.

FIG. 2 illustrates an exemplary implementation of a chassis management module 200 in an illustrative embodiment. In the example of FIG. 2, the chassis management module 200 comprises an enclosure controller 205 and a management services module 215. The enclosure controller 205 is discussed further below in conjunction with FIG. 3. Generally, the enclosure controller 205 discovers, deploys, monitors and/or logs various devices within a given chassis, such as chassis 108. In addition, the enclosure controller 205 may control power allocations and cooling for such devices within the given chassis.

Figure 3:
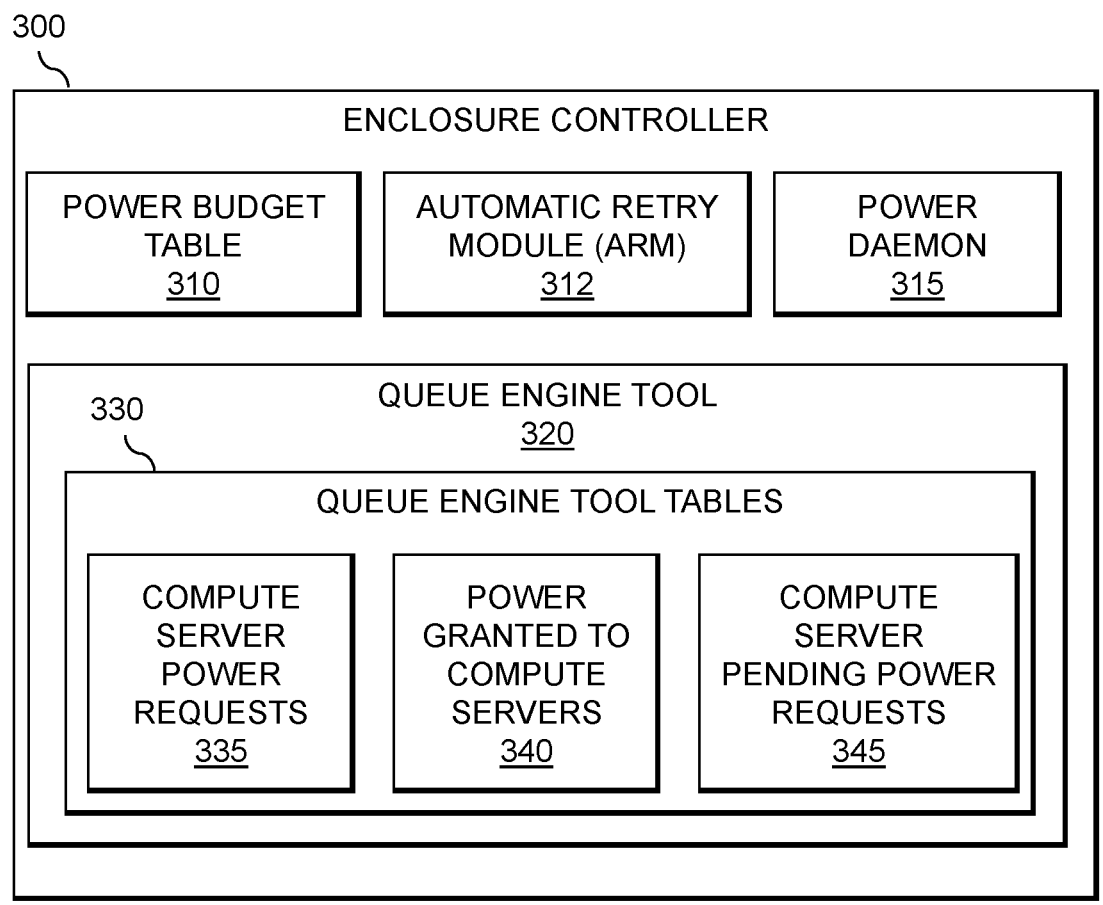
FIG. 3 illustrates an exemplary implementation of the enclosure controller of FIG. 2 in further detail in an illustrative embodiment.

In at least some embodiments, the management services module 215 provides cluster level support and a common software console for interfacing with various aspects of the given chassis. FIG. 3 illustrates an exemplary implementation of an enclosure controller 300 in an illustrative embodiment. In the example of FIG. 3, the enclosure controller 300 comprises a power budget table 310, an automatic retry module 312, a power daemon 315 and a queue engine tool 320. In at least some embodiments, the power budget table 310 specifies a maximum and minimum power required by the chassis for a given configuration, as discussed further below in conjunction with FIGS. 6A and 6B.

The automatic retry module 312, in some embodiments, evaluates a power budget availability from the queue engine tool 320, as discussed further below, and automatically grants requests to apply power to a given compute server when the given compute server resumes execution following a faulty state.

The power daemon 315, in some embodiments, detects power requests from compute servers and stores the power requests in one or more tables 330 of the queue engine tool 320, as discussed further below in conjunction with FIG. 7, for example. The queue engine tool 320 stores power requests from each compute server in a compute server power requests table 335. In addition, the queue engine tool 320 moves the power requests from the compute server power requests table 335 to a power granted to compute servers table 340, when a given power request is granted, or to a compute server pending power requests table 345, when a corresponding compute server fails to respond or communicate, as discussed further below in conjunction with FIG. 7.

Figure 4:
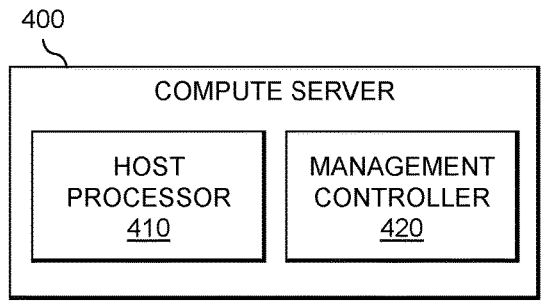
FIG. 4 illustrates an exemplary implementation of a compute server of FIG. 1 in further detail in an illustrative embodiment.

FIG. 4 illustrates an exemplary implementation of a compute server of FIG. 1 in further detail in an illustrative embodiment. In the example of FIG. 4, the compute server 400 comprises a host processor 410 and a management controller 420.

The exemplary host processor 410 may comprise, for example, a host operating system and a device driver manager that comprises and manages one or more device drivers. In addition, the host processor 410 may comprise one or more root ports for communicating with other devices, such as solid-state devices and the management controller 420.

In one or more embodiments, the exemplary management controller 420 may be implemented, for example, as a baseboard management controller (BMC), such as the Integrated Dell Remote Access Controller (iDRAC), commercially available from Dell Technologies, or another out-of-band controller. The management controller 420 may comprise a system management bus port that communicates with system management bus ports of other devices, such as the solid-state devices. The management controller 420 may further comprise a management controller operating system and one or more management interface drivers.

Figure 5:
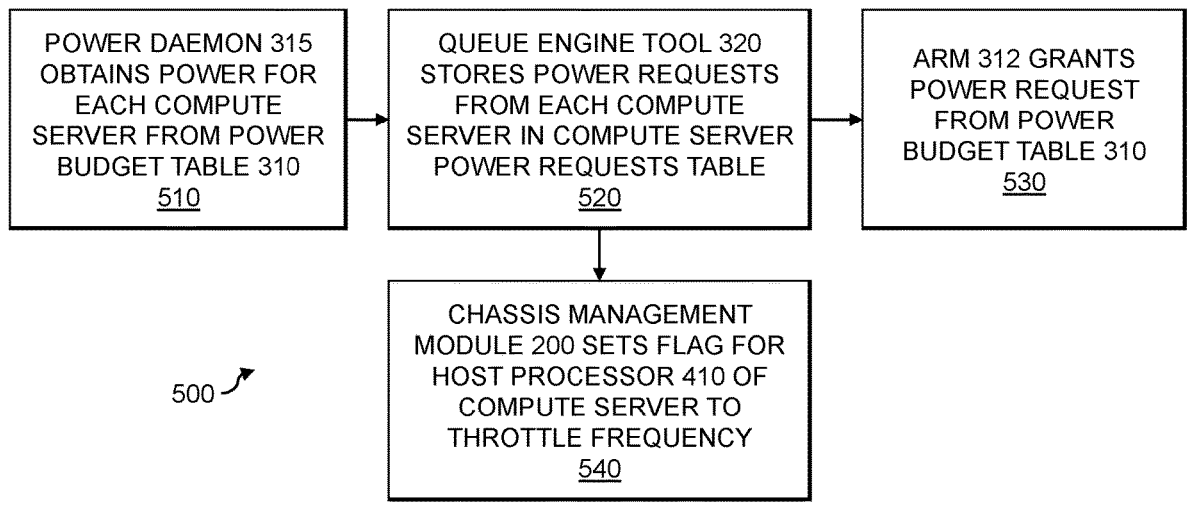
FIG. 5 is a flow diagram illustrating an exemplary implementation of a process for state-based automated allocation of power to compute servers in a chassis of a modular server in an illustrative embodiment.

FIG. 5 is a flow diagram illustrating an exemplary implementation of a process 500 for state-based automated allocation of power to compute servers in a chassis of a modular server in an illustrative embodiment. In the example of FIG. 5, the power daemon 315 of FIG. 3 obtains the allocated power for each compute server 400 from the power budget table 310 in step 510, as discussed further below in conjunction with FIGS. 6A and 6B. Step 510 may be performed, for example, by the power daemon 315 of FIG. 3.

In step 520, the queue engine tool 320 stores any power requests from each compute server 400 in the compute server power requests table 335, as discussed further below in conjunction with FIG. 7. In this manner, if a given compute server halts execution, there is a cache of power requests available that may be used to approve the power allocation for the given compute server.

The automatic retry module 312 grants power requests in step 530 from the power budget table 310. Thus, if a given compute server halts execution, and then resumes execution, the power allocation request for the given compute server may be automatically approved, as discussed further below in conjunction with FIG. 8.

The chassis management module 200 sets a flag for the host processor 410 of compute server to throttle the operating frequency in step 540, as discussed further below in conjunction with FIG. 9. For example, if a given compute server exceeds an assigned threshold amount of power, the processor of the given compute server may be throttled to reduce the power utilization.

FIGS. 6A and 6B comprise an exemplary implementation of a first portion 600-A and a second portion 600-B, respectively, of a power budget table of FIG. 3 in an illustrative embodiment. The power budget table of FIGS. 6A and 6B may be maintained, for example, by the power daemon 315 of FIG. 3 in one or more tables, as would be apparent to a person of ordinary skill in the art.

In the example of FIG. 6A, the first portion 600-A of the power budget table indicates that the base power of the chassis 108 includes a 15 watt power allocation request (PAR) for each slot (e.g., each compute server) of the chassis 108, with 6245 watts being assigned to the compute servers for an FTB (Fast Throttled Boundary) phase, 4505 watts being assigned to the compute servers for an FTR (Fault Tolerance Redundancy) phase and 4430 watts being assigned to the compute servers for an NLB (Node manager Lower Boundary) phase. The total system power allocations are shown for categories of base (chassis), thermal (e.g., fans), IO modules (IOM, also referred to as switches) and compute servers.

In the example of FIG. 6B, the second portion 600-B of the power budget table indicates the system power allocation detail for each unit within each category summarized in the first portion 600-A of the power budget table of FIG. 6A. For example, in the thermal category, there are nine fans shown with the corresponding power allocations for each phase (FTB, FTR and NLB). In the IO module category, there are four IO modules shown with the corresponding power allocations for each phase. In the compute server category, there are five compute servers shown with the corresponding power allocations for each phase.

As shown in FIG. 6B, the power allocations for the fans (thermal) and IO modules are static and do not vary for each phase (e.g., FTB, FTR and NLB). The power allocations of the compute servers are generally dynamic and vary for each phase (e.g., FTB, FTR and NLB). Thus, in at least some embodiments, the disclosed techniques for automated power allocation are performed with respect to the power allocations of the compute servers.

Figure 7:
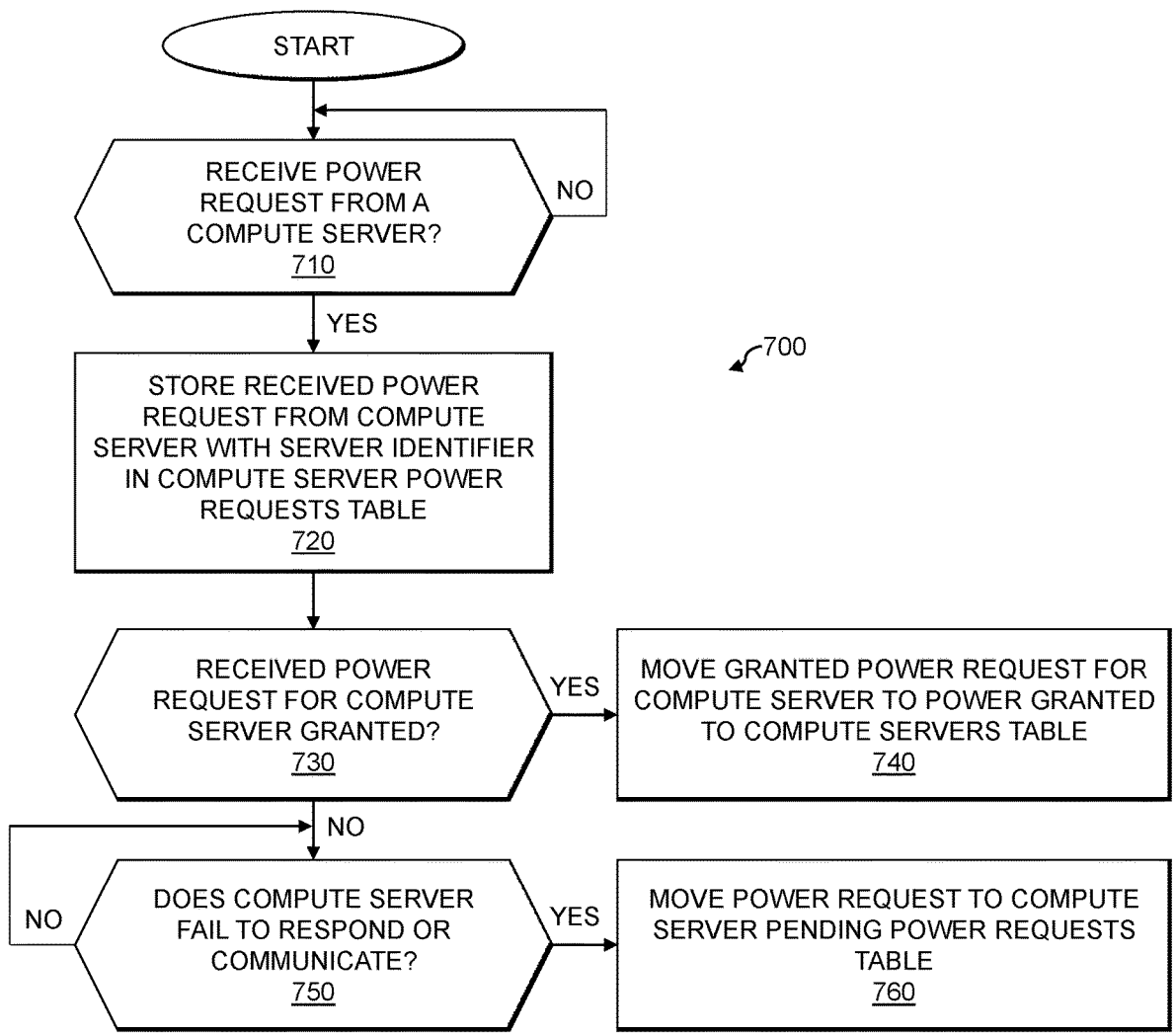
FIG. 7 is a flow diagram illustrating an exemplary implementation of a process for storing requests from compute servers in the compute server power requests table of FIG. 3 in an illustrative embodiment.

FIG. 7 is a flow diagram illustrating an exemplary implementation of a process 700 for storing requests from compute servers in the compute server power requests table of FIG. 3 in an illustrative embodiment. In some embodiments, the process 700 of FIG. 7 may be performed by the queue engine tool 320 of FIG. 3.

In the example of FIG. 7, a test is performed in step 710 to determine if a power request is received from a compute server. If it is determined in step 710 that a power request is received from a compute server, then the received power request from the compute server is stored with a server identifier in the compute server power requests table 335 in step 720. If, however, it is determined in step 710 that a power request is not received from a compute server, then program control returns to step 710 to continue monitoring for received power requests.

A test is performed in step 730 to determine if the received power request for the compute server is granted. If it is determined in step 730 that the received power request for the compute server is granted, then the granted power request for the compute server is moved in step 740 to the power granted to compute servers table 340.

If, however, it is determined in step 730 that the received power request for the compute server is not granted, then a further test is performed in step 750 to determine if the compute server fails to respond or communicate. If it is determined in step 750 that the compute server does not fail to respond or communicate, then program control returns to step 750 to continue monitoring for the compute server failing to respond or communicate. If, however, it is determined in step 750 that the compute server fails to respond or communicate, then the power request is moved to the compute server pending power requests table 345 in step 760.

Figure 8:
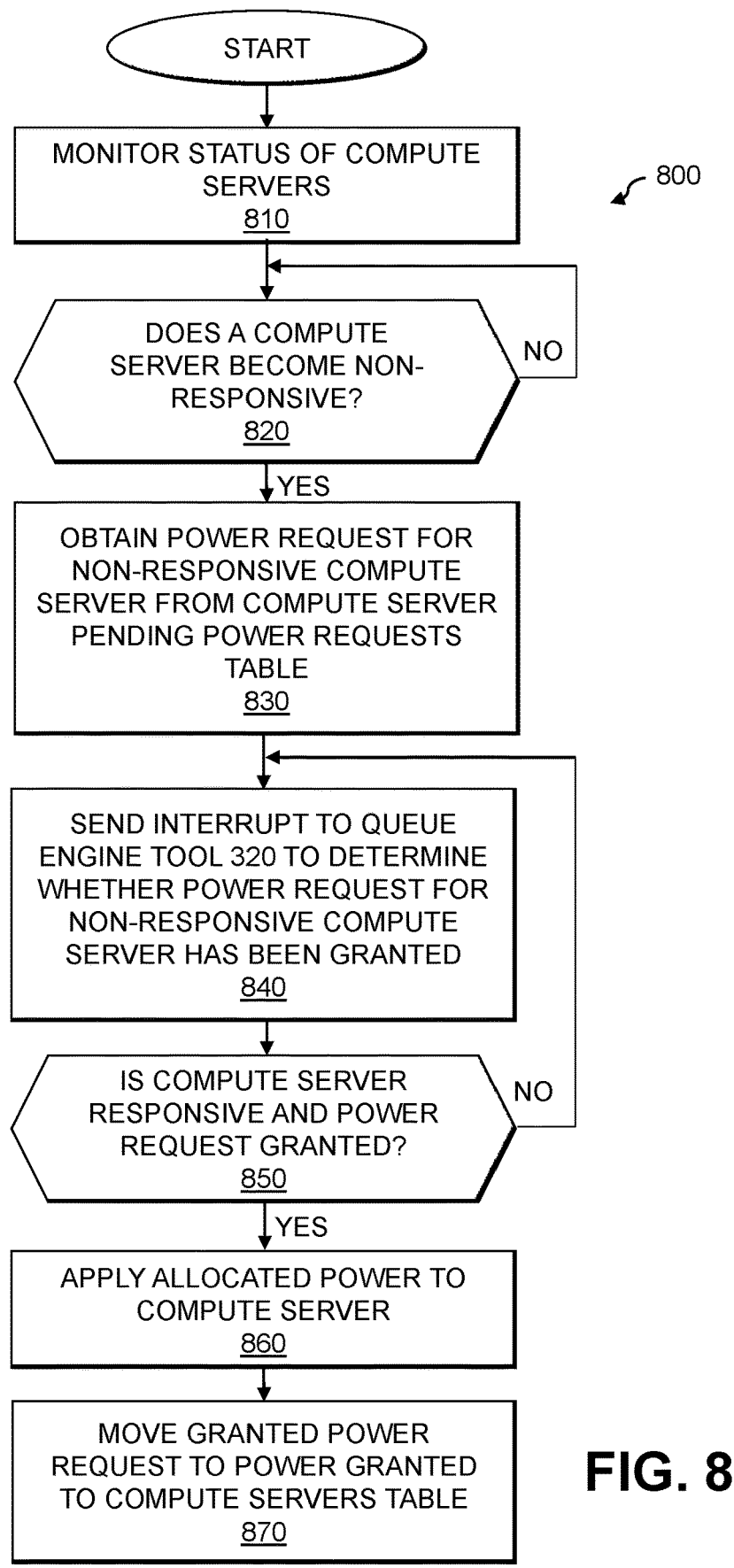
FIG. 8 is a flow diagram illustrating an exemplary implementation of a process for granting power requests from the power budget table of FIG. 3 in an illustrative embodiment.

FIG. 8 is a flow diagram illustrating an exemplary implementation of a process 800 for granting power requests from the power budget table of FIG. 3 in an illustrative embodiment. In some embodiments, the process 800 of FIG. 8 may be performed by the automatic retry module 312 of FIG. 3, for example, when a given compute server halts execution during a boot process.

In the example of FIG. 8, the process 800 monitors the status of the compute servers 400 in step 810. For example, a health status of each slot of the chassis 108 may be monitored to determine if a compute server goes from an operational state to a non-operational state. A test is performed in step 820 to determine if a compute server becomes non-responsive. If it is determined in step 820 that a compute server does not become non-responsive, then program control returns to step 820 to continue monitoring for a non-responsive compute server.

If it is determined in step 820 that a compute server becomes non-responsive, then a power request for the non-responsive compute server is obtained from the compute server pending power requests table 345 in step 830. In step 840, an interrupt is sent to the queue engine tool 320 to determine whether the obtained power request for the non-responsive compute server has been granted (for example, by evaluating a signal, such as a flag, set within the chassis by the power daemon 315 in response to the pending power request for the non-responsive compute server being granted). In at least some embodiments, the granting of the pending power request is based at least in part on an evaluation of the available power (for example, from the power supply units 116) relative to the power demands of at least some of the power-consuming devices in the chassis 108, using the power budget table 310 of FIG. 3.

A test is performed in step 850 to determine if the compute server is responsive and if the power request is granted. For example, a health status of each slot of the chassis 108 may be monitored to determine if the non-responsive compute server goes from a non-operational state to an operational state, for example. If it is determined in step 850 that the compute server is still non-responsive and/or if the power request is not granted, then program control returns to step 840 to resend the interrupt to the queue engine tool 320 and continues in the manner described above. If it is determined in step 850 that the compute server is responsive and that the power request is granted, then the allocated power is applied to the compute server in step 860, and the granted power request is moved in step 870 to the power granted to compute servers table 340. In some embodiments, one or more of steps 830, 840 and 850 may be performed in a substantially continuous loop until the non-responsive compute server is found to be responsive in step 850.

Figure 9:
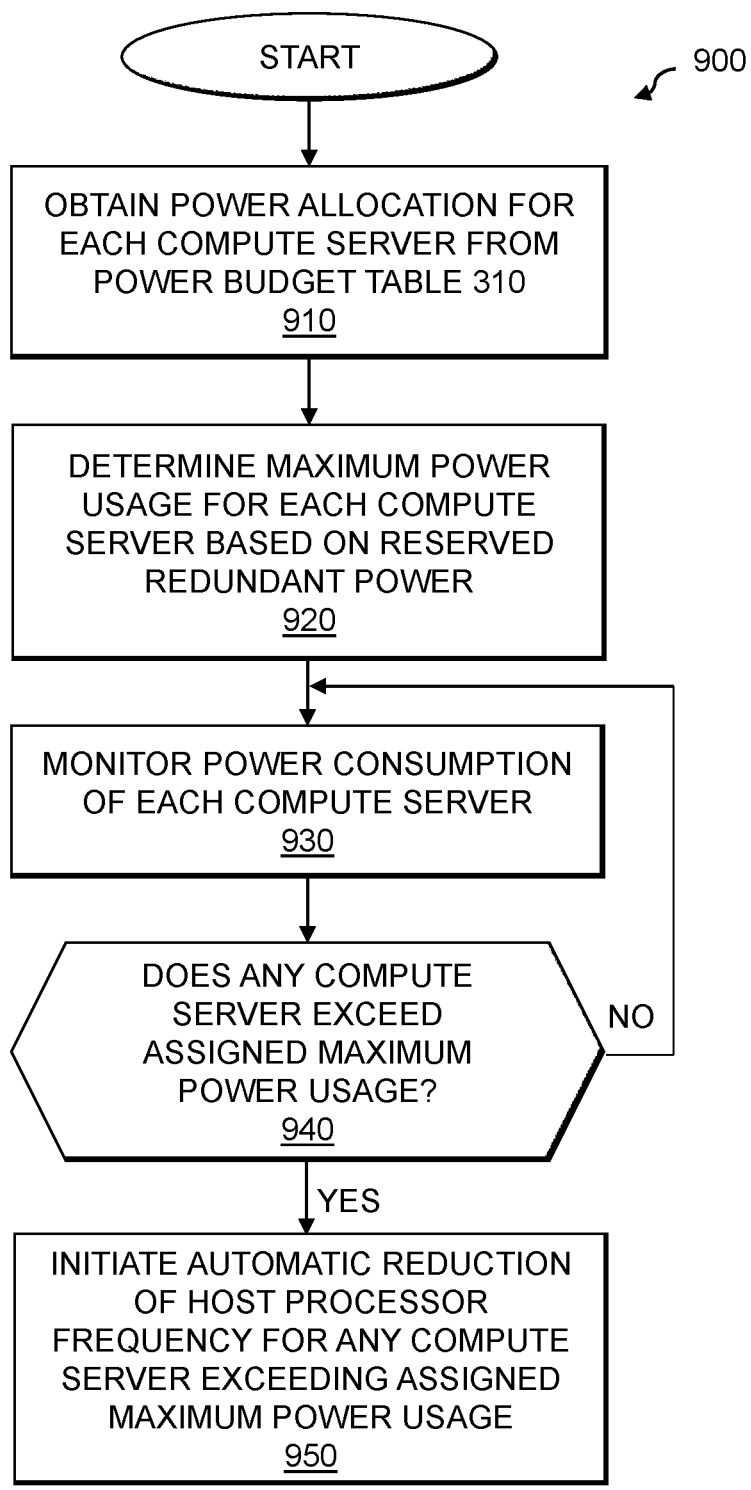
FIG. 9 is a flow diagram illustrating an exemplary implementation of a process for controlling an operating frequency of one or more host processors in an illustrative embodiment.

FIG. 9 is a flow diagram illustrating an exemplary implementation of a process 900 for controlling an operating frequency of one or more host processors in an illustrative embodiment. The process 900 may be implemented in some embodiments by the chassis management module 120 of FIG. 1.

In the example of FIG. 9, the process 900 initially obtains a power allocation in step 910 for each compute server from the power budget table 310. A maximum power usage is determined in step 920 for each compute server based on a designated amount of reserved redundant power. If a given chassis 108 has three power supply units 116 that each provide 3 kilowatts of power, and it is desired to reserve 3 kilowatts of power for redundancy, then power may be consumed in a range of 5-6 kilowatts.

The process 900 monitors the power consumption of each compute server in step 930. A test is performed in step 940 to determine if any compute server exceeds the assigned maximum power usage. If it is determined in step 940 that no compute server is exceeding the assigned maximum power usage, then program control returns to step 930 to continue monitoring the power consumption of each compute server. If, however, it is determined in step 940 that at least one compute server is exceeding the assigned maximum power usage, then the process 900 initiates an automatic reduction of a host processor frequency for any compute server exceeding the respective assigned maximum power usage in step 950. For example, a flag may be set for any compute server exceeding the respective assigned maximum power usage as an indication to throttle the operating frequency.

Figure 10:
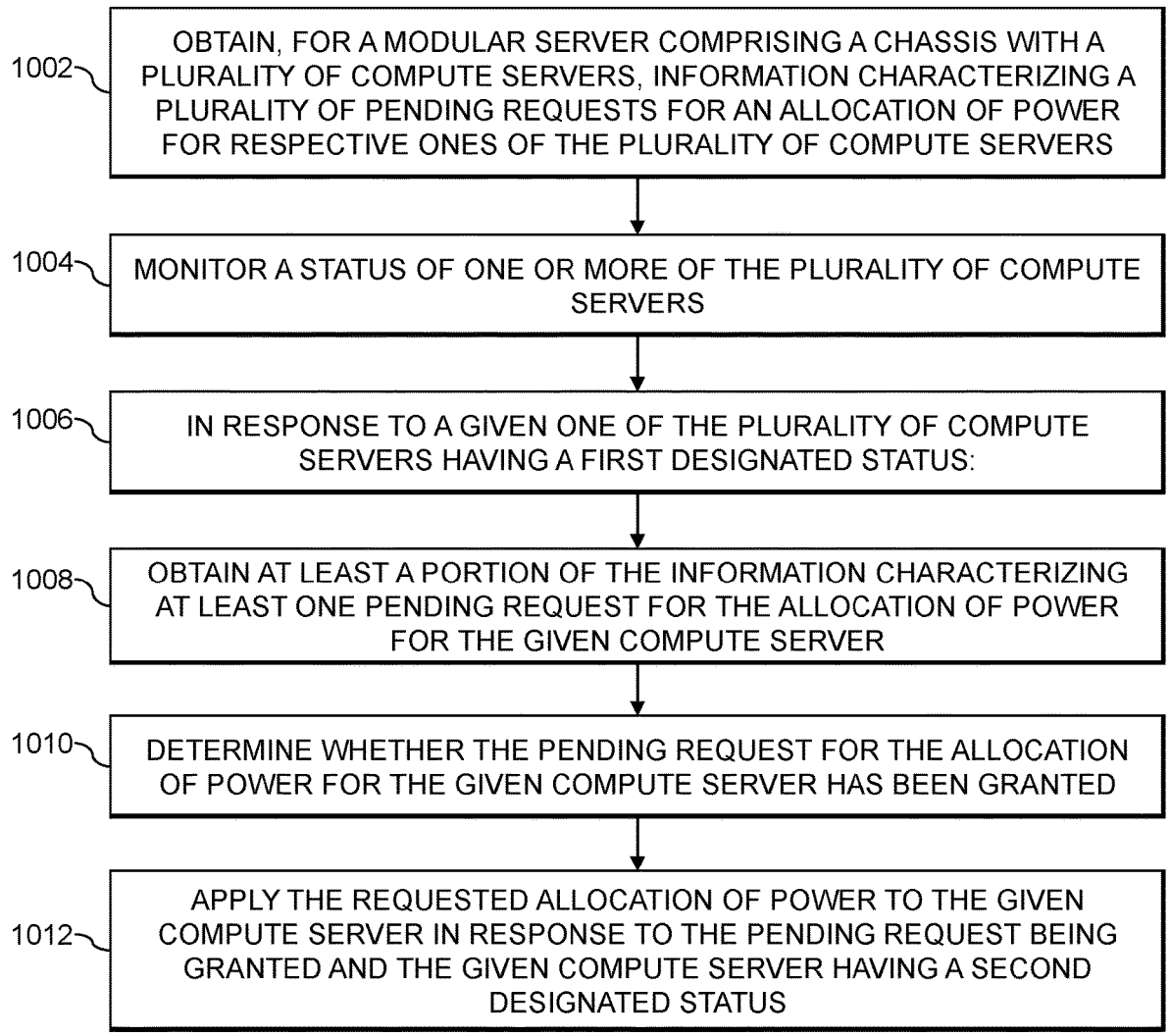
FIG. 10 is a flow diagram illustrating an exemplary implementation of a process for state-based automated allocation of power to compute servers in a chassis of a modular server, according to an embodiment.

FIG. 10 is a flow diagram illustrating an exemplary implementation of a process for state-based automated allocation of power to compute servers in a chassis of a modular server, according to an embodiment. In the example of FIG. 10, information characterizing a plurality of pending requests for an allocation of power for respective ones of the plurality of compute servers is obtained in step 1002 for a modular server comprising a chassis with a plurality of compute servers.

In step 1004 a state of one or more of the plurality of compute servers is monitored. In response to a given one of the plurality of compute servers having a first designated state, in step 1006, steps 1008 through 1012 are performed.

In step 1008, at least a portion of the information characterizing a pending request for the allocation of power for the given compute server is obtained. A determination is made in step 1010 of whether the pending request for the allocation of power for the given compute server has been granted (for example, by sending an interrupt to initiate the determination and/or by evaluating a signal, such as a flag, set within the chassis, for example, by the power daemon 315 in response to the pending power request being granted, as discussed above in conjunction with FIG. 8). The requested allocation of power is applied to the given compute server in step 1012 in response to the pending request being granted and the given compute server having a second designated state.

In one or more embodiments, the first designated state comprises the given compute server failing to respond to one or more communications and the second designated state comprises the given compute server being responsive to one or more communications.

In some embodiments, the at least the portion of the information characterizing a given one of the pending requests for the allocation of power is automatically stored in a first table (e.g., the compute server power requests table 335 of FIG. 3) in response to a receipt of the given pending request for the allocation of power from the corresponding compute server. The at least the portion of the information characterizing the given pending request for the allocation of power for the corresponding compute server may be moved to a second table (e.g., the power granted to compute servers table 340) in response to the given pending request being granted. The at least the portion of the information characterizing the given pending request for the allocation of power for the corresponding compute server may be moved to a third table (e.g., the compute server pending power requests table 345) in response to the compute server associated with the given pending request having a third designated state (e.g., a compute server associated with the given pending request failing to respond and/or communicate).

In at least one embodiment, a plurality of allocated power values is obtained for respective ones of the plurality of compute servers; a power usage threshold is determined for at least one of the plurality of compute servers; a power consumption of the at least one compute server is monitored; and an automatic reduction of a processor frequency of the at least one compute server is initiated in response to the at least one compute server exceeding the power usage threshold. The power usage threshold for the at least one compute server may be based at least in part on a reservation of redundant power.

The particular processing operations and other network functionality described in conjunction with FIGS. 5 and 7 through 10, for example, are presented by way of illustrative example only, and should not be construed as limiting the scope of the disclosure in any way. Alternative embodiments can use other types of processing operations to provide functionality for state-based automated allocation of power to compute servers in a chassis of a modular server. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for state-based automated allocation of power to compute servers in a chassis of a modular server will now be described in greater detail with reference to FIGS. 11 and 12. Although described in the context of information processing system 100, these platforms may also be used to implement at least portions of other information processing systems in other embodiments.

Figure 11:
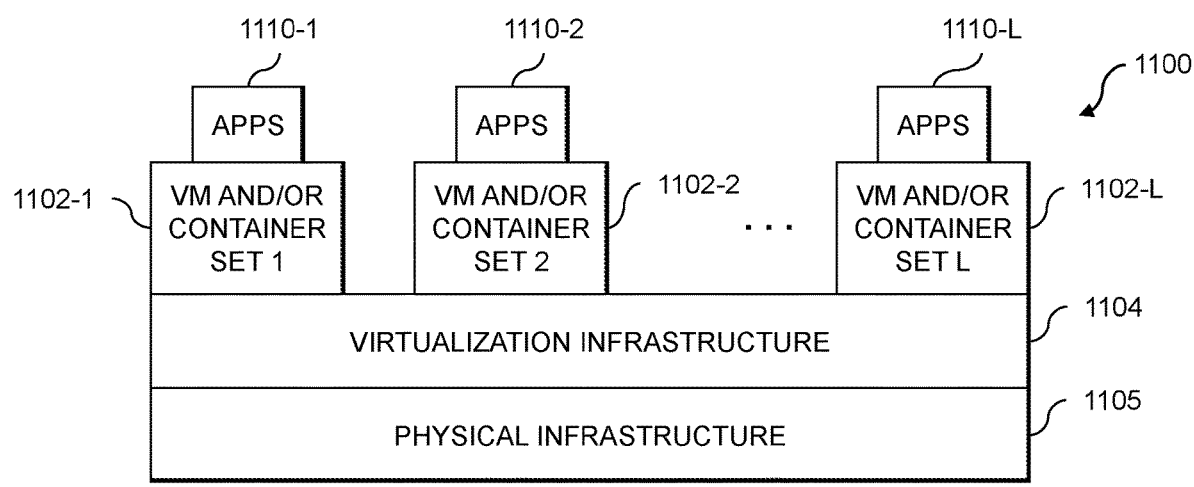
FIGS. 11 and 12 show examples of processing platforms that may be utilized to implement at least a portion of an information processing system in illustrative embodiments.
Figure 12:
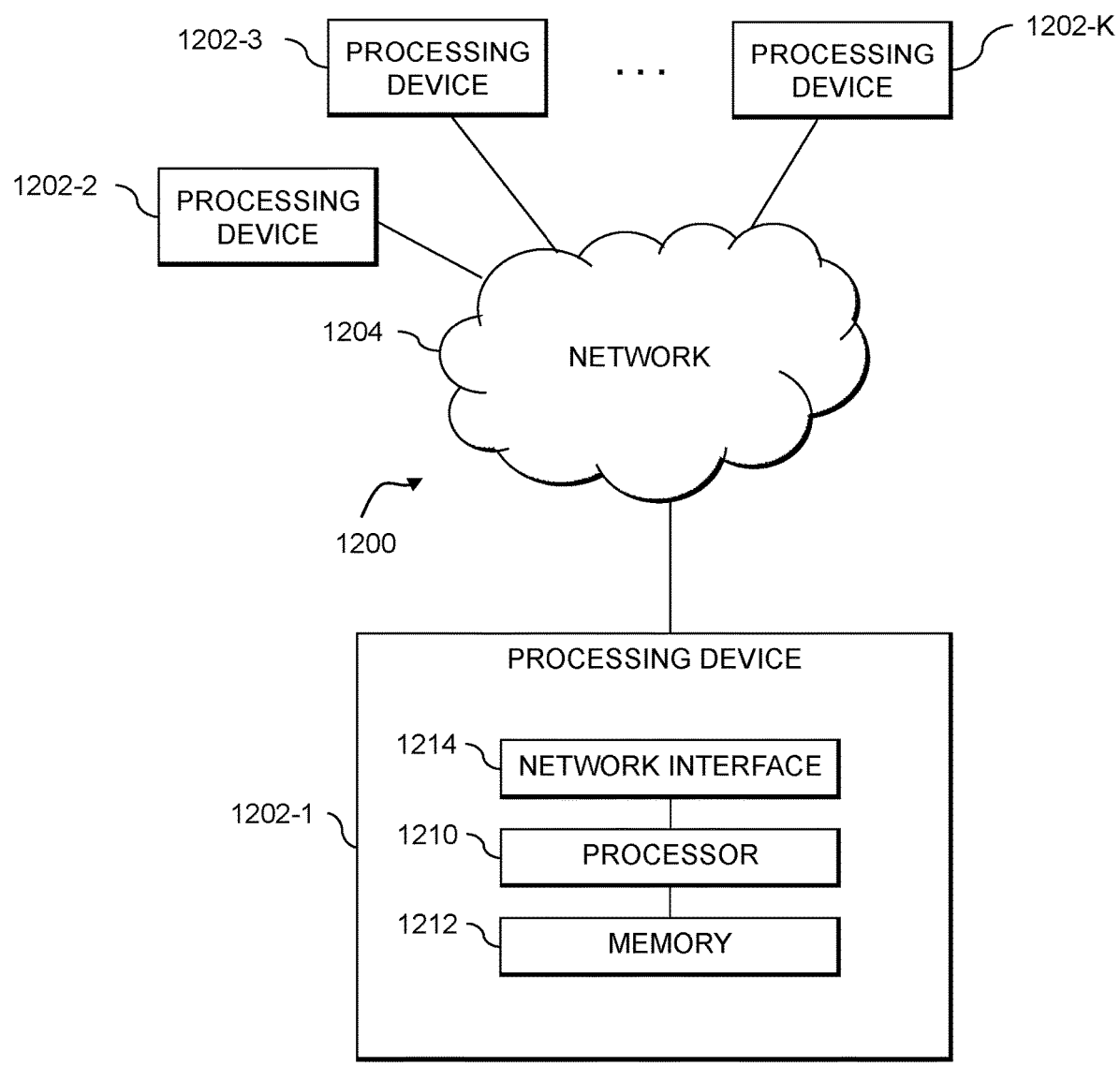

FIG. 11 shows an example processing platform comprising cloud infrastructure 1100. The cloud infrastructure 1100 comprises a combination of physical and virtual processing resources that may be utilized to implement at least a portion of the information processing system 100 in FIG. 1. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of information processing system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for state-based automated allocation of power to compute servers in a chassis of a modular server as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining, for a modular server comprising a chassis with a plurality of compute servers, information characterizing a plurality of pending requests for an allocation of power for respective ones of the plurality of compute servers;
    monitoring a state of one or more of the plurality of compute servers;
    in response to a given one of the plurality of compute servers failing to respond to one or more communications:
    obtaining at least a portion of the information characterizing the pending request for the allocation of power for the given compute server;
    sending a signal to at least one processing device of the modular server to determine whether the pending request for the allocation of power for the given compute server has been granted;
    determining, by the at least one processing device of the modular server, whether (i) the pending request for the allocation of power for the given compute server has been granted, and (ii) the given compute server is responsive to one or more communications; and
    selectively applying, responsive to a result of the determining, the requested allocation of power to the given compute server;
    wherein the method is performed by at least one processing device comprising a processor coupled to a memory.

2. The method of claim 1, wherein the at least the portion of the information characterizing a given one of the pending requests for the allocation of power is automatically stored in a first table in response to a receipt of the given pending request for the allocation of power from the corresponding compute server.

3. The method of claim 2, wherein the at least the portion of the information characterizing the given pending request for the allocation of power for the corresponding compute server is moved to a second table in response to the given pending request being granted.

4. The method of claim 2, wherein the at least the portion of the information characterizing the given pending request for the allocation of power for the corresponding compute server is moved to a third table in response to the compute server associated with the given pending request having a third designated state.

5. The method of claim 1, wherein the determining whether the pending request for the allocation of power for the given compute server has been granted comprises evaluating a signal, within the chassis, set in response to the pending power request being granted.

6. The method of claim 1, further comprising obtaining a plurality of allocated power values for respective ones of the plurality of compute servers; determining a power usage threshold for at least one of the plurality of compute servers; monitoring a power consumption of the at least one compute server; and initiating an automatic reduction of a processor frequency of the at least one compute server in response to the at least one compute server exceeding the power usage threshold.

7. The method of claim 6, wherein the power usage threshold for the at least one compute server is based at least in part on a reservation of redundant power.

8. The method of claim 6, further comprising setting a flag for the at least one compute server, in response to the at least one compute server exceeding the power usage threshold, as an indication to throttle the processor frequency.

9. An apparatus comprising:
    at least one processing device comprising a processor coupled to a memory;
    the at least one processing device being configured to implement the following steps:
    obtaining, for a modular server comprising a chassis with a plurality of compute servers, information characterizing a plurality of pending requests for an allocation of power for respective ones of the plurality of compute servers;
    monitoring a state of one or more of the plurality of compute servers;

in response to a given one of the plurality of compute servers failing to respond to one or more communications:
obtaining at least a portion of the information characterizing the pending request for the allocation of power for the given compute server;
sending a signal to at least one processing device of the modular server to determine whether the pending request for the allocation of power for the given compute server has been granted;
determining, by the at least one processing device of the modular server, whether (i) the pending request for the allocation of power for the given compute server has been granted, and (ii) the given compute server is responsive to one or more communications; and
selectively applying, responsive to a result of the determining, the requested allocation of power to the given compute server.

10. The apparatus of claim 9, wherein the at least the portion of the information characterizing a given one of the pending requests for the allocation of power is automatically stored in a first table in response to a receipt of the given pending request for the allocation of power from the corresponding compute server.

11. The apparatus of claim 10, wherein the at least a portion of the information characterizing the given pending request for the allocation of power for the corresponding compute server is moved to one or more of (i) a second table in response to the given pending request being granted and (ii) a third table in response to the compute server associated with the given pending request having a third designated state.

12. The apparatus of claim 9, wherein the determining whether the pending request for the allocation of power for the given compute server has been granted comprises evaluating a signal, within the chassis, set in response to the pending power request being granted.

13. The apparatus of claim 9, further comprising obtaining a plurality of allocated power values for respective ones of the plurality of compute servers; determining a power usage threshold for at least one of the plurality of compute servers; monitoring a power consumption of the at least one compute server; and initiating an automatic reduction of a processor frequency of the at least one compute server in response to the at least one compute server exceeding the power usage threshold.

14. The apparatus of claim 13, further comprising setting a flag for the at least one compute server, in response to the at least one compute server exceeding the power usage threshold, as an indication to throttle the processor frequency.

15. The apparatus of claim 13, wherein the power usage threshold for the at least one compute server is based at least in part on a reservation of redundant power.

16. A non-transitory processor-readable storage medium having stored therein program code of one or more software programs, wherein the program code when executed by at least one processing device causes the at least one processing device to perform the following steps:
obtaining, for a modular server comprising a chassis with a plurality of compute servers, information characterizing a plurality of pending requests for an allocation of power for respective ones of the plurality of compute servers;
monitoring a state of one or more of the plurality of compute servers;
in response to a given one of the plurality of compute servers failing to respond to one or more communications:
obtaining at least a portion of the information characterizing the pending request for the allocation of power for the given compute server;
sending a signal to at least one processing device of the modular server to determine whether the pending request for the allocation of power for the given compute server has been granted;
determining, by the at least one processing device of the modular server, whether (i) the pending request for the allocation of power for the given compute server has been granted, and (ii) the given compute server is responsive to one or more communications; and
selectively applying, responsive to a result of the determining, the requested allocation of power to the given compute server.

17. The non-transitory processor-readable storage medium of claim 16, wherein the at least the portion of the information characterizing a given one of the pending requests for the allocation of power is automatically stored in a first table in response to a receipt of the given pending request for the allocation of power from the corresponding compute server.

18. The non-transitory processor-readable storage medium of claim 17, wherein the at least a portion of the information characterizing the given pending request for the allocation of power for the corresponding compute server is moved to one or more of (i) a second table in response to the given pending request being granted and (ii) a third table in response to the compute server associated with the given pending request having a third designated state.

19. The non-transitory processor-readable storage medium of claim 16, further comprising obtaining a plurality of allocated power values for respective ones of the plurality of compute servers; determining a power usage threshold for at least one of the plurality of compute servers; monitoring a power consumption of the at least one compute server; and initiating an automatic reduction of a processor frequency of the at least one compute server in response to the at least one compute server exceeding the power usage threshold.

20. The non-transitory processor-readable storage medium of claim 19, wherein the power usage threshold for the at least one compute server is based at least in part on a reservation of redundant power.

* * * * *